US009674296B2

(12) United States Patent
Ghandeharizadeh et al.

(10) Patent No.: US 9,674,296 B2
(45) Date of Patent: Jun. 6, 2017

(54) PREVENTING RACE CONDITION FROM CAUSING STALE DATA ITEMS IN CACHE

(71) Applicants: Shahram Ghandeharizadeh, Los Angeles, CA (US); Jason Yap, Rancho Palos Verdes, CA (US)

(72) Inventors: Shahram Ghandeharizadeh, Los Angeles, CA (US); Jason Yap, Rancho Palos Verdes, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 638 days.

(21) Appl. No.: 13/927,027

(22) Filed: Jun. 25, 2013

(65) Prior Publication Data

US 2014/0012938 A1    Jan. 9, 2014

Related U.S. Application Data

(60) Provisional application No. 61/669,257, filed on Jul. 9, 2012.

(51) Int. Cl.
*G06F 13/00* (2006.01)
*H04L 29/08* (2006.01)

(52) U.S. Cl.
CPC ................... *H04L 67/2852* (2013.01)

(58) Field of Classification Search
CPC .. G06F 12/12; G06F 12/0891; G06F 2212/69; H04L 67/2852
USPC ........................................................ 711/133
See application file for complete search history.

(56) References Cited

U.S. PATENT DOCUMENTS

| 7,039,765 | B1 * | 5/2006 | Wilkes ......................... 711/133 |
| 2002/0188591 | A1 | 12/2002 | Santosuosso |
| 2006/0106759 | A1 * | 5/2006 | Nemoto et al. .................... 707/2 |
| 2012/0036317 | A1 * | 2/2012 | Torii ............................. 711/108 |
| 2012/0054444 | A1 * | 3/2012 | Wang ............................ 711/133 |
| 2014/0149365 | A1 | 5/2014 | Minborg |

OTHER PUBLICATIONS

Cassandra Wiki. 2011. Distributed Deletes. Last edited Sep. 12, 2011 by Eric Tamme (located Nov. 6, 2013 at http://wiki.apache.org/cassandra/DistributedDeletes), 1 page.

(Continued)

*Primary Examiner* — Yong Choe
(74) *Attorney, Agent, or Firm* — McDermott Will & Emery LLP

(57) ABSTRACT

A data cache server may process requests from a data cache client to put, get, and delete data items into or from the data cache server. Each data item may be based on data in a data store. In response to each request to put a data item into the data cache server, the data cache server may determine whether any of the data in the data store on which the data item is based has or may have changed; put the data item into the data cache memory if none of the data in the data store on which the data item is based has been determined to have or maybe to have changed, and not put the data item into the data cache memory if data in the data store on which the data item is based has been determined to have or maybe to have changed.

25 Claims, 3 Drawing Sheets

(56) References Cited

OTHER PUBLICATIONS

Github. 2011. Rantav/Hector User Guide: User Guide, including "Dealing with Tombstones" at p. 10. Last revision Sep. 22, 2011 (located Nov. 6, 2013 at https://github.com/rantav/hector/wiki/User-Guide#dealing-with-tombstones), 15 pages.

Johnson, P. et al. 1975. The maintenance of duplicate databases. Network Working Group, RFC #677, NIC #31507, rfc677.txt, submitted Jan. 1975, 9 pages.

Nishtala, R. et al. 2013. Scaling Memcache at Facebook. 10th Usenix Symposium on Networked Systems Design and Implementation (NSDI 13), USENIX Association, pp. 385-398.

Oster, G. et al. 2006. Tombstone Transformation Functions for Ensuring Consistency in Collaborative Editing Systems. In Proceedings of the 2nd International Conference on Collaborative Computing: Networking, Applications and Worksharing, 2006, 10 pages.

Saito, Y. et al. 2000. Optimistic Replication for Internet Data Services. In Conference on Distributed Computing (Disc), 12 pages.

Ross, K.A. 1996. Materialized View Maintenance and Integrity Constraint Checking: Trading Space for Time. In Proceedings of the 1996 ACM SIGMOD international conference on Management of data (SIGMOD '96), Jennifer Widom (Ed.). ACM, New York, NY, USA, 447-458. DOI=10.1145/233269.233361 http://doi.acm.org/10.1145/233269.233361.

USPTO. 2016. Office Action, dated Apr. 7, 2016, for U.S. Appl. No. 14/209,619, filed Mar. 13, 2014, published as US 2014/0279944 A1, Sep. 18, 2014, entitled "SQL Query to Trigger Translation for Maintaining Consistency of Cache Augmented SQL Systems," Ghandeharizadeh et al., inventors.

\* cited by examiner

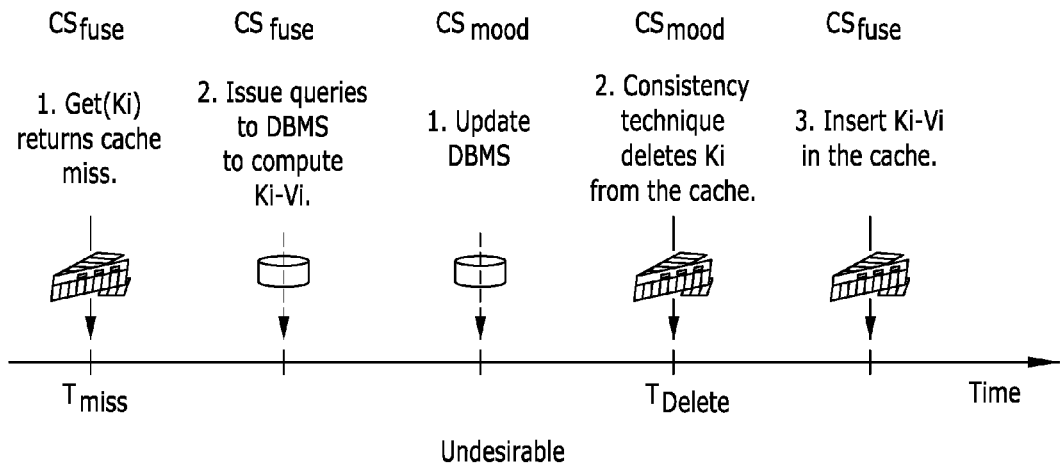

FIG. 2B

| delete ($k_j$) |
|---|
| 1. If $k_j$ -$v_j$ exists then delete $k_j$ -$v_j$ and generate gumball $g_j$ , i.e., $k_j$ -$g_j$ , with $T_{gj}$ set to current time. |
| 2. If $k_j$ -$g_j$ exists then change $T_{gj}$ to the current time. |
| 3. If no entry exists for $k_j$ then generate $g_j$ , i.e., $k_j$-$g_j$ , with $T_{gj}$ set to current time. |
| get($k_j$) |
| 1. If $k_j$ -$v_j$ exists then return $v_j$ |
| 2. If either $k_j$ -$g_j$ exists or no entry exists for $k_j$ then report a cache miss with current time as $T_{miss}$ time stamp. |
| put($k_j$ ,$v_j$ ,$T_{miss}$) |
| 1. Let $T_C$ be the server system time. |
| 2. If ($T_C$ -$T_{miss}$ > $\Delta$) then ignore the put operation. |
| 3. If ($g_j$ exists and $T_{miss}$ is before $T_{gj}$) then ignore the put operation. |
| 4. If ($v_j$ exists and its time stamp is after $T_{miss}$) then ignore the put. |
| 5. If ($T_{miss}$ < $T_{adjust}$) then ignore the put operation. |
| 6. Otherwise, insert $k_j$ -$v_j$ with its time stamp set to $T_{miss}$ |

FIG. 3

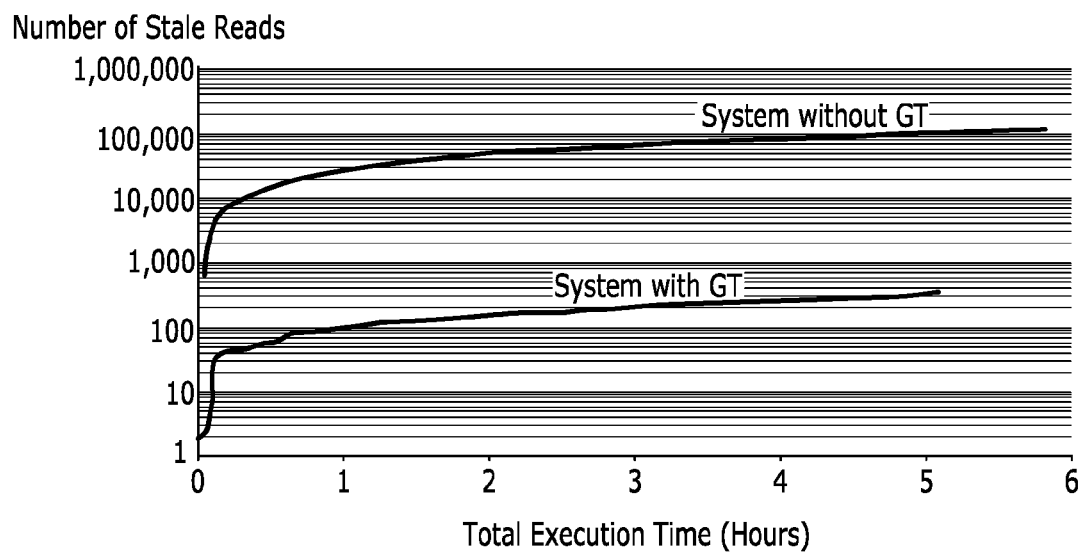
FIG. 4
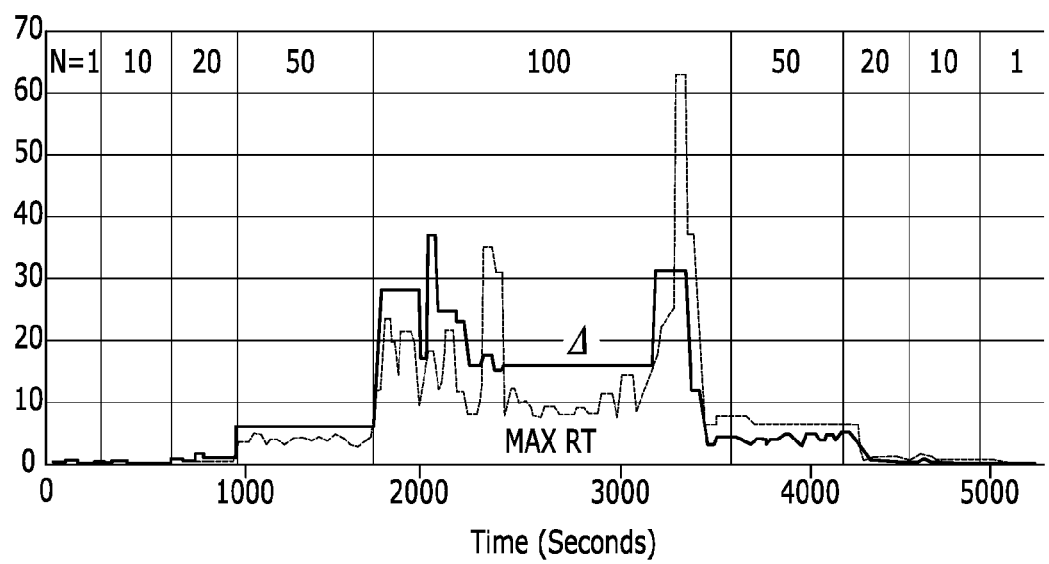
FIG. 5   2) Value of Δ

PREVENTING RACE CONDITION FROM CAUSING STALE DATA ITEMS IN CACHE

CROSS-REFERENCE TO RELATED APPLICATION

This application is based upon and claims priority to U.S. provisional patent application 61/669,257, entitled "A Race Condition Technique That Prevents Caches (Such As Memcached Used By Well Known Web Site Destinations Such As Facebook, Youtube, Etc.) From Becoming Inconsistent With The Database," filed Jul. 9, 2012. The entire content of this application is incorporated herein by reference.

BACKGROUND

1. Technical Field

This disclosure relates to data cache servers, to data cache clients, to data stores, and to inconsistencies between cached data and data in a data store on which the cashed data was based.

2. Description of Related Art

The workload of certain application classes, such as social networking, may be dominated by queries that read data. See F. Benevenuto, T. Rodrigues, M. Cha, and V. Almeida, "*Characterizing user behavior in online social networks,*" in Internet Measurement Conference, 2009. An example is a user profile page. A user may update her profile page rarely, such as only once every few hours, days, or even weeks. During these same periods, these profile pages may be referenced and displayed frequently, such as every time the user logs in and navigates between pages.

To enhance system performance, these applications may augment a data store, such as a standard SQL-based relational database management system (RDBMS), e.g., MySQL, with a data cache server. The data cache server may use a Key-Value Store (KVS), materializing key-value pairs computed using normalized relational data. A key-value pair might be finely tuned to the requirements of an application, e.g., dynamically generated HTML formatted pages. See J. Challenger, P. Dantzig, and A. Iyengar, "*A Scalable System for Consistently Caching Dynamic Web Data,*" in proceedings of the 18th Annual Joint Conference of the IEEE Computer and Communications Societies, 1999; A. Iyengar and J. Challenger, "*Improving Web Server Performance by Caching Dynamic Data,*" in proceedings of the USENIX Symposium on Internet Technologies and Systems, pages 49-60, 1997; C. Amza, G. Soundararajan, and E. Cecchet, "*Transparent Caching with Strong Consistency in Dynamic Content Web Sites,*" in Supercomputing, ICS '05, pages 264-273, New York, N.Y., USA, 2005, ACM; V. Holmedahl, B. Smith, and T. Yang, "*Cooperative Caching of Dynamic Content on a Distributed Web Server,*" in HPDC, pages 243-250, 1998; K. S. Candan, W. Li, Q. Luo, W. Hsiung, and D. Agrawal, "*Enabling dynamic content caching for database-driven web sites,*" in SIGMOD Conference, pages 532-543, 2001; A. Datta, K. Dutta, H. M. Thomas, D. E. VanderMeer, and K. Ramamritham, "*Proxy-based Acceleration of Dynamically Generated Content on the World Wide Web: An Approach and Implementation,*" ACM Transactions on Database Systems, pages 403-443, 2004. The KVS may manage a large number (billions) of such highly optimized representations.

A cache augmented SQL RDBMS (CASQL) may enhance performance dramatically because a KVS look up may be significantly faster than processing SQL queries. This explains the popularity of memcached, an in-memory distributed KVS deployed by sites such as YouTube, see C. D. Cuong, "*YouTube Scalability*", Google Seattle Conference on Scalability, June 2007, and Facebook, see P. Saab, "*Scaling memcached at Facebook*", December 2008; R. Nishtala et. al., "Scaling Memcache at Facebook," in 10$^{th}$ USENIX Symposium on Networked Systems Design and Implementation, 385-398 (2013).

With CASQLs, a consistency technique may maintain the relationship between the normalized data and its key-value representation, may detect changes to the normalized data, and may invalidate the corresponding key-value(s) stored in the KVS. Other possibilities include refreshing, see J. Challenger, P. Dantzig, and A. Iyengar, "*A Scalable System for Consistently Caching Dynamic Web Data,*" in proceedings of the 18th Annual Joint Conference of the IEEE Computer and Communications Societies, 1999; S. Ghandeharizadeh and J. Yap, "*Cache Augmented Database Management Systems,*" in Third ACM SIGMOD Workshop on Databases and Social Networks, 2013, or incrementally updating, see P. Gupta, N. Zeldovich, and S. Madden, "*A Trigger-Based Middleware Cache for ORMs,*" in Middleware, 2011, the corresponding key-value. Almost all techniques may suffer from race conditions, as explained in more detail below. The significance of these race conditions has been highlighted in D. R. K. Ports, A. T. Clements, I. Zhang, S. Madden, and B. Liskov, "*Transactional consistency and automatic management in an application data cache,*" in OSDI. USENIX, October 2010. This article describes how a web site may decide to not materialize failed key-value lookups because the KVS may become inconsistent with the database permanently.

As an example, consider Alice who is trying to retrieve her profile page while the web site's administrator is trying to delete her profile page due to her violation of the site's terms of use. Below is a discussion that shows how an interleaved execution of these two logical operations may leave the KVS inconsistent with the database such that the KVS reflects the existence of Alice's profile page, while the database is left with no records pertaining to Alice. A subsequent reference for the key-value pair corresponding to Alice's profile page thus may undesirably succeed, incorrectly reflecting Alice's existence in the system.

SUMMARY

A data cache server may process requests from a data cache client to put, get, and delete data items into or from the data cache server. A data item may be based on data in a data store. The data cache server may include a data cache memory that stores data items and a processing system, which may include a processor. In response to each request to put a data item into the data cache server, the processing system may determine whether any of the data in the data store on which the data item is based has or may have changed, put the data item into the data cache memory if none of the data in the data store on which the data item is based has been determined to have or maybe to have changed; and not put the data item into the data cache memory if data in the data store on which the data item is based has been determined to have or maybe to have changed. In response to each request to get a data item from the data cache server, the processing system may read the requested data item from the data cache memory and delivers it to the data cache client that requested the data item, if the requested data item is present in the data cache memory.

In response to each request to delete a data item from the data cache server, the processing system may delete the requested data item from the data cache memory, if it is present in the data cache memory.

In response to each request to delete a data item, the processing system may store a delete time at which the request to delete the data item is processed.

In response to each request to delete a data item, the processing system may check whether an earlier delete time for that data item is in storage and, if so, change the stored delete time for that data item to the current time.

The processing system may delete each delete time from storage when the difference between the current time and the stored delete time exceeds a per-determined threshold. The processing system may dynamically adjust the pre-determined threshold based on real time measurements of the time it takes a data item to be created from data in the data store and delivered to the data cache server.

In response to each request to get a data item from the data cache server, the processing system may determine whether the requested data items is in the data cache memory and, if not, report the miss to the data cache client that sent the request to get the data item, along with the miss time at which the miss occurred.

A request to put a data item into the data cache server may include a miss time indicative of a time at which a previously request to get the data item from the data cache server was unsuccessful. In response to this request to put, the processing system may not put the data item into the data cache memory if the miss time is before a stored delete time for the data item.

The processing system may purge delete times from storage when needed to free up storage.

Each data item in the data cache memory may be stored along with a key value and a storage time at which the data item was stored in the data cache memory. In response to a request to put, the processing system may not put the data item into the data cache memory if there is another data item in the data cache memory with the same key value as the data item that is requested to be put, and the miss time of the data item that is requested to be put is before the storage time of the other data item with the same key value.

In response to the request to put, the processing system may store the miss time with the data item in the data cache memory.

The processing system may delete data items in the data cache memory to free up space in the data cache memory and, when it does so, save the time at which each data item is deleted.

A data cache client may including a processing system that includes a processor that sends requests to a data cache server to put, get, and delete data items into or from the data cache server. In response to each request to get a data item from the data cache server that does not exist in the data cache server, the processing system may receive a response from the data cache server that indicates that the data item does not exist on the data cache server, along with a miss time at which the miss occurred, and store the miss time. Along with each request to put a data item in the data cache server that was previously indicated as being missing from the data cache server in response to a request to get the data item, the processing system may send the miss time along with the request to put.

A non-transitory, tangible, computer-readable storage medium containing a program of instructions may be configured to cause a processing system that includes a processor in a data cache server and/or a data cache client running the program of instructions to perform any combination of the functions described above.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIGS. 2A and 2B each illustrate an example of an interleaved processing process that reference a key-value pair. FIG. 2A illustrates an example with an acceptable result; while FIG. 2B illustrates an example with the same key-value pair with an undesirable result.

FIG. 3 illustrates an example of algorithms that may be employed to eliminate a race condition in a data cache server and associated staleness in data items in that data cache server that might otherwise result.

FIG. 4 shows the number of requests that observe stale data when a system is configured to either use or not gumball technique discussed below.

FIG. 5 illustrates an example of a varying system load.

DETAILED DESCRIPTION OF ILLUSTRATIVE EMBODIMENTS

Figure 1:
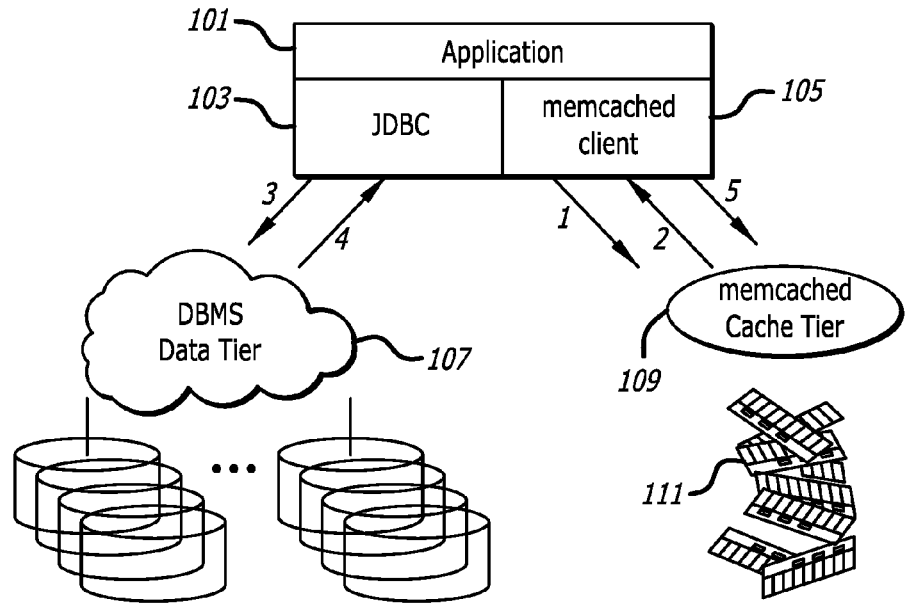
FIG. 1 illustrates an example of a cache augmented SQL relational database management system (CASQL).

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Query intensive applications may augment a relational database management system (RDBMS) with a middle or other tier cache to enhance performance. Each database application may be run on a database application client and may access data in a data store that is contained in and managed by one or more database servers. Several different database applications may each access the same data store in the same database server. Each database application may include a data cache client that gets, puts, and deletes data items to and from one or more data cache servers. Each data item may be based on data in a data store.

Each database application client and database server, each data cache client and data cache server, each database application client and data cache client, and each database server and data cache server may be run on the same or a different computer. Thus, for example, a database application client, database server, data cache client, and data cache server may each be on a different computer or may all be on the same computer.

An example of a data cache client and server is memcached. Memcached is in use by very large, well known sites, such as Facebook. In the presence of updates to the normalized tables of an RDBMS, invalidation based consistency techniques may delete the impacted key-value pairs residing in the cache. A subsequent reference for these key-value pairs observes a cache miss, re-computes the new values from the RDBMS, and inserts the new key-value pairs in the cache. These techniques may suffer from race conditions that result in cache states that produce stale cached data.

The gumball technique (GT) that is now discussed may prevent these race conditions. Experimental results show that the GT may enhance the accuracy of an application hundreds of folds, while only slightly reduce system performance in some cases.

The GT may detect race conditions and prevent them from causing key-value pairs to become inconsistent with tabular data. The GT may be application transparent, deadlock free (non-blocking), and implemented by a KVS.

One underlying principle of the GT may be to ignore cache put operations when needed to prevent inconsistent or possibly inconsistent states. The advantages of this approach may be several. First, it may apply to all applications that use a CASQL, freeing each application from implementing its own race condition detection technique. This may reduce the complexity of application software, minimizing costs. Second, in experiments, it reduced the number of observed inconsistencies dramatically (more than ten fold). Third, the GT may not require specific features from an RDBMS and may be used with all off-the-shelf RDBMSs, as well as custom ones. Fourth, the GT may adjust to varying system loads and may have no external settings that require adjustment by an administrator. Fifth, while the GT may employ time stamps, it may not suffer from clock drift and may not require synchronized clocks because its time stamps may be local to a (partitioned) cache server.

The GT may slow down an application slightly when almost all (99%) requests are serviced using KVS. This may be because the GT may re-direct requests that may retrieve stale cache data to process SQL queries using the RDBMS.

An example design of the GT and how it detects and prevents race conditions is now presented. An implementation and evaluation of the GT using a social networking benchmark is also considered. Obtained results show that the GT may impose negligible overhead, while reducing the percentage of inconsistencies dramatically.

Detailed Problem Statement

FIG. 1 illustrates an example of a cache augmented SQL relational database management system (CASQL). As illustrated in FIG. 1, the CASQL may include a client computer 101 that includes a database application client, such as a JDBC database application client 103, and a data cache client, such as a memcached client 105. The JDBC database application client 103 may issue one or more queries, such as SQL queries, to one or more database servers, such as to database servers 107, and receive responses in response.

Similarly, the memcached client 105 may issue one or more gets, puts, and deletes of data items. Each data item may be based on data in a data store, such as data in one or the database servers 107. Each data item may include a key-value pair.

The memcached client 105 may issue these calls to one or more data cache servers, such as to a memcached cache tier 109. Each data cache server may have one or more memories, each configured to store one or more data items, such as a memory 111. Each data cache server and data cache client may also have a processing system that may include one or more processors configured to case the data cache server and client, respectively, to implement the functions described herein. The database servers and data cache servers may similarly service many other database application clients and data cache clients, respectively. The various computers may communicate with one another using any protocol, such as TCP.

A typical use of such a system is illustrated by flow arrows 1-5. These show processing of a code segment fuse $CS_{fuse}$ with a key reference whose value is not found in the KVS.

The key-value pairs in KVS might pertain to the results of a query, see S. Ghandeharizadeh and J. Yap, "*Cache Augmented Database Management Systems,*" in Third ACM SIGMOD Workshop on Databases and Social Networks, 2013, or semi structured data obtained by executing several queries and gluing their results together using application specific logic, see J. Challenger, P. Dantzig, and A. Iyengar, "*A Scalable System for Consistently Caching Dynamic Web Data,*" in Proceedings of the 18th Annual Joint Conference of the IEEE Computer and Communications Societies, 1999; K. S. Candan, W. Li, Q. Luo, W. Hsiung, and D. Agrawal, "*Enabling dynamic content caching for database-driven web sites,*" in SIGMOD Conference, pages 532-543, 2001; D. R. K. Ports, A. T. Clements, I. Zhang, S. Madden, and B. Liskov, "*Transactional consistency and automatic management in an application data cache,*" in OSDI, USENIX, October 2010; S. Ghandeharizadeh and J. Yap, "*Cache Augmented Database Management Systems,*" in Third ACM SIGMOD Workshop on Databases and Social Networks, 2013. With the former, the query string may be the key and its result set may be the value. The latter might be the output of either a developer designated read-only function, see D. R. K. Ports, A. T. Clements, I. Zhang, S. Madden, and B. Liskov, "*Transactional consistency and automatic management in an application data cache,*" in OSDI, USENIX, October 2010, or code segment that consumes some input to produce an output, see S. Ghandeharizadeh and J. Yap, "*Cache Augmented Database Management Systems,*" in the Third ACM SIGMOD Workshop on Databases and Social Networks, 2013. In the presence of updates to the RDBMS, a consistency technique deployed either at the application or the RDBMS may delete the impacted cached key-value pairs. This delete operation may race with a look up that observes a cache miss, resulting in stale cached data.

To illustrate a race condition, assume the user issues a request that invokes a segment of code ($CS_{fuse}$) that references a $k_j$-$v_j$ pair that is not KVS resident because it was just deleted by an update issued to the RDBMS. This corresponds to Alice in the example above referencing her profile page after updating her profile information. The administrator who is trying to delete Alice from the system invokes a different code segment ($CS_{mod}$) to delete $k_j$-$v_j$. Even though both $CS_{mod}$ and $CS_{fuse}$ employ the concept of transactions, their KVS and RDBMS operations may be non-transactional and may leave the KVS inconsistent.

Figure 2A:
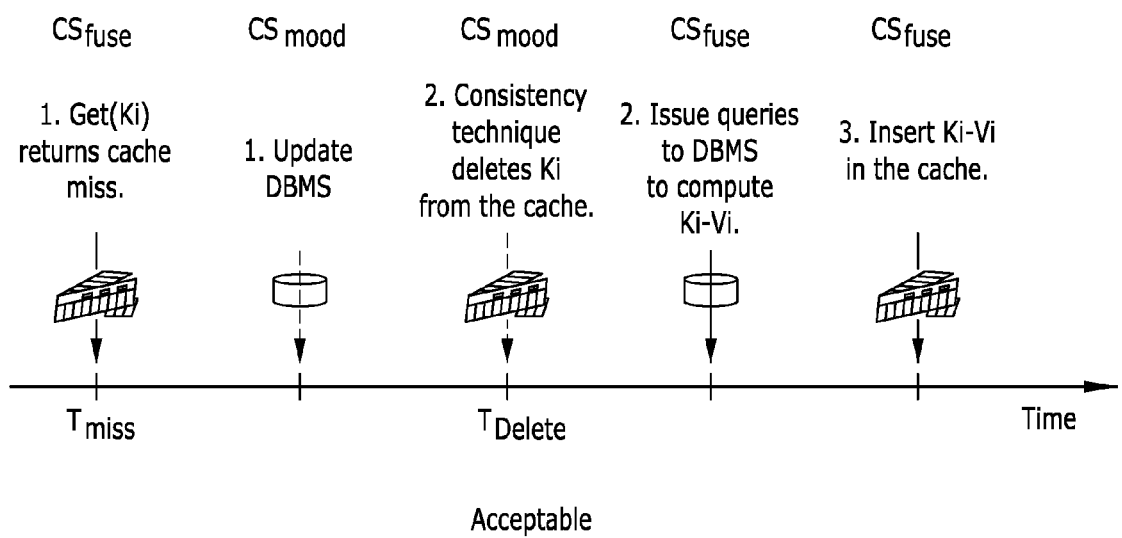

FIGS. 2A and 2B each illustrate an example of an interleaved processing process that references a key-value pair. FIG. 2A illustrates an example with an acceptable result; while FIG. 2B illustrates an example the same key-value pair with an undesirable result.

In FIG. 2B, $CS_{fuse}$ looks up the KVS and observes a miss, also represented by Arrows 1 and 2 in FIG. 1, and computes $k_j$-$v_j$ by processing its body of code that issues SQL queries (a transaction) to the RDBMS to compute $v_j$, also represented by arrows 3 and 4 in FIG. 1.

Prior to $CS_{fuse}$ executing arrow 5 I FIG. 1, $CS_{mod}$ issues both its transaction to update the RDBMS and delete command to update the KVS. Next, $CS_{fuse}$ inserts $k_j$-$v_j$ into the KVS. This schedule, see FIG. 2B, renders the KVS inconsistent with the RDBMS. A subsequent look up of $k_j$ from KVS produces a stale value $v_j$ with no corresponding tabular data in the RDBMS.

In sum, a race condition may be an interleaved execution of $CS_{fuse}$ and $CS_{mod}$ with both referencing the same key-value pair. Not all race conditions are undesirable; only those that cause the key-value pairs to become inconsistent with tabular data in a data store.

An undesirable race condition may be an interleaved execution of one or more threads executing $CS_{mod}$ with one or more threads executing $CS_{fuse}$ that satisfy the following criteria. First, the thread(s) executing $CS_{fuse}$ construct a key-value pair prior to those threads that execute $CS_{mod}$ that update the RDBMS. And, CS mod threads delete their impacted key-value pair from KVS prior to $CS_{fuse}$ threads inserting their computed key-value pairs in the KVS. FIG. 2B shows an interleaved processing process that satisfies these conditions, resulting in an undesirable race condition. The race condition of FIG. 2A does not result in an inconsistent state and therefore may be acceptable.

FIG. 3 illustrates an example of algorithms that may be employed to eliminate this race condition in a data cache server and associated staleness in data items in that data cache server. More specifically, FIG. 3 illustrates an example of a GT enabled delete, get, and put pseudo-code in a data cache server that may be implemented by a processing system that includes at least one processor. All time stamps may be local to the server containing $k_i$-$v_i$.

Gumball Technique (GT)

The GT may be configured to prevent the race conditions described above from causing key-value pairs to become inconsistent with tabular data in a data store. It may be implemented within the KVS by extending its operations (delete, get and put) to manage gumballs. Examples of its operating details are now presented.

When the data cache server receives a delete ($k_i$) request, and there is no value for $k_i$ in the KVS, the GT may store the arrival time of the delete ($T_{delete}$) in a gumball $g_i$ and insert the delete time in the KVS with key $k_i$. When several delete ($k_i$) requests are issued, such as back to back, the GT may maintain only one $g_i$, denoting it with only the time stamp of the latest delete ($k_i$). The GT may assigns a fixed time to live, $\Delta$, to each $k_i$-$g_i$ to prevent them from occupying KVS memory longer than necessary, and delete any $k_i$-$g_i$ pair whose delete time exceeds this threshold age. The value of $\Delta$ may be computed dynamically, as explained below.

When the data cache server processes a get ($k_i$) request and observes a KVS miss, the GT may provide the KVS client component (client for short) with a miss time stamp, $T_{miss}$. The data cache client may maintain $k_i$ and its $T_{miss}$ time stamp. Once $CS_{fuse}$ computes a value for $k_i$ and performs a put operation, the data cache client may extend this call with $T_{miss}$. With this put ($k_i$, $v_i$, $T_{miss}$), a GT enabled KVS data cache server may compare $T_{miss}$ with the current time ($T_c$). If their difference exceeds $\Delta$, $T_c$-$T_{miss}$>$\Delta$, then the data cache server may ignore the put operation. This is because a gumball might have existed but is no longer in the KVS as it timed out.

Otherwise, there may be three possibilities: Either (1) there exists a gumball for $k_i$, $k_i$-$g_i$; (2) the KVS server has no entry for $k_i$; or (3) there is an existing value for $k_i$, $k_i$-$v_i$. Each case is now considered.

With the first possibility, the data cache server may compare $T_{miss}$ with the time stamp of the gumball. If the miss happened before the $g_i$ time stamp, $T_{miss}$<$T_{gumball}$, then there is a race condition and the put operation may be ignored. Otherwise, the put operation succeeds. This means $g_i$ (i.e., the gumball) may be overwritten with $v_i$. Moreover, the data cache server may maintain $T_{miss}$ as metadata for this $k_i$-$v_i$. (This $T_{miss}$ may be used in the third scenario to detect stale put operations, see discussions of the third scenario below.)

In the second scenario, the data cache server may insert $k_i$-$v_i$ in the KVS and maintains $T_{miss}$ as metadata of this key-value pair.

In the third scenario, a KVS server may implement two possible solutions. With the first, the server may compare $T_{miss}$ of the put operation with the metadata of the existing $k_i$-$v_i$ pair. The former must be greater in order for the put operation to over-write the existing value. Otherwise, there might be a race condition and the put operation is ignored. A more expensive alternative may be for the KVS to perform a byte-wise comparison of the existing value with the incoming value. If they differ, then it may delete $k_i$-$v_i$ to force the application to produce a consistent value.

The GT may ignore the put operation with both acceptable and undesirable race conditions. See discussion of FIGS. 2A and 2B above. For example, with the acceptable race condition of FIG. 2A, the GT may reject the put operation of $CS_{fuse}$ because its $T_{miss}$ is before $T_{gumball}$. These may reduce the number of requests serviced using the KVS. Instead, they may execute the fusion code that issues SQL queries to the RDBMS. This may be significantly slower than a KVS look up, degrading system performance.

Value of $\Delta$

Ideally, $\Delta$ may be set to the elapsed time from when $CS_{fuse}$ observes a KVS miss for $k_i$ to the time it issues a put ($k_i$, $v_i$, $T_{miss}$) operation. $\Delta$ values greater than this ideal may be undesirable because they may cause gumballs to occupy memory longer than necessary, reducing the KVS hit rate of the application. $\Delta$ values lower than ideal may cause the GT to reject KVS insert operations unnecessarily, see Step 2 of the put pseudo-code in FIG. 2. They may slow down a CASQL significantly because they may prevent the server from caching key-value pairs. In one experiment, the GT configured with a small $\Delta$ value slowed the system down ten folds by causing the KVS to sit empty and re-direct all requests to the RDBMS for processing. The next section describes how the GT may compute the value of $\Delta$ dynamically.

Dynamic Computation of $\Delta$

The GT may adjust the value of $\Delta$ dynamically in response to CASQL load to avoid values that render the KVS empty and idle. The dynamic technique is based on the observation that the KVS server may estimate the $CS_{fuse}$ response time, RT, by subtracting the current time ($T_c$) from $T_{miss}$: RT=$T_c$-$T_{miss}$. When a put is rejected because its RT is higher than $\Delta$, the GT may set the value of $\Delta$ to this RT multiplied by an inflation ($\alpha$) value, $\Delta$=RT×$\alpha$. For example, $\alpha$ might be set to 1.1 to inflate $\Delta$ to be 10% higher than the maximum observed response time. (See below for a discussion of $\alpha$ and its value.)

Increasing the value of $\Delta$ may mean that requests that observed a miss prior to this change may now pass the race condition detection check. This may be because the GT may have rejected one or more of these put requests with the smaller $\Delta$ value when performing the check $T_c$-$T_{miss}$>$\Delta$. To prevent such requests from polluting the cache, the GT may maintain the time stamp of when it increased the value of $\Delta$, $T_{adjust}$. It may ignore all put operations with $T_{miss}$ prior to $T_{adjust}$.

The GT may reduce the value of $\Delta$ when a $k_i$-$g_i$ is replaced with a $k_i$-$v_i$. It may maintain the maximum response time, $RT_{max}$, using a sliding window of time, such as 60 seconds (duration of sliding window may be a configuration parameter of the KVS server). If this maximum multiplied by an inflation value ($\alpha$) is lower than the current value of $\Delta$, then it may reset $\Delta$ to this lower value, $\Delta = RT_{max} \times \alpha$. Decreasing the value of $\Delta$ may not require setting $T_{adjust}$ to the current time stamp: Those put requests that satisfy the condition $T_c - T_{miss} > \Delta$ may continue to satisfy it with the smaller $\Delta$ value.

The dynamic $\Delta$ computation technique may use $\alpha$ values greater than 1 to maintain $\Delta$ slightly higher than its ideal value. In essence, it may trade memory to minimize the likelihood of Step 2 of the put pseudo-code (see FIG. 3) $k_i$-$g_i$ $k_i$-$g_i$ from ignoring its cache insert unnecessarily and redirecting future references to the RDBMS. This may prevent the possibility of an application observing degraded system performance due to a burst of requests that incur KVS misses and are slowed down by competing with one another for RDBMS processing. Moreover, gumballs may have a small memory footprint. This in combination with a low probability of updates may minimize the likelihood of extra gumballs from impacting the KVS hit rate adversely.

Evaluation

This section analyzes the performance of an application consistency technique with and without the GT using a realistic social networking benchmark based on a web site named RAYS. Other popular benchmarking tools were considered such as RUBiS, see C. Amza, A. Chanda, A. Cox, S. Elnikety, R. Gil, K. Rajamani, W. Zwaenepoel, E. Cecchet, and J. Marguerite, "*Specification and Implementation of Dynamic Web Site Benchmarks,*" in Workshop on Workload Characterization, 2002, YCSB, see B. F. Cooper, A. Silberstein, E. Tam, R. Ramakrishnan, and R. Sears, "*Benchmarking Cloud Serving Systems with YCSB,*" in Cloud Computing, 2010, and YCSB++, see S. Patil, M. Polte, K. Ren, W. Tantisiriroj, L. Xiao, J. López, G. Gibson, A. Fuchs, and B. Rinaldi, *YCSB++: Benchmarking and Performance Debugging Advanced Features in Scalable Table Stores,*" in Cloud Computing, New York, N.Y., USA, 2011, ACM. What could not be used was RUBiS and YCSB, see B. F. Cooper, A. Silberstein, E. Tam, R. Ramakrishnan, and R. Sears. Benchmarking Cloud Serving Systems with YCSB. in *Cloud Computing*, 2010, because neither quantifies the amount of stale data. The inconsistency window metric quantified by YCSB++, see S. Patil, M. Polte, K. Ren, W. Tantisiriroj, L. Xiao, J. López, G. Gibson, A. Fuchs, and B. Rinaldi, *YCSB++: Benchmarking and Performance Debugging Advanced Features in Scalable Table Stores,*" in Cloud Computing, New York, N.Y., USA, 2011, ACM, measures the delay from when an update is issued until it is consistently reflected in the system. This metric may be inadequate because it may not measure the amount of stale data produced due to race conditions by multiple threads. Below is a description of the workload. Subsequently, performance results and characterizations of the performance of Gumball with different $\Delta$ values are presented.

RAYS and a Social Networking Benchmark

Recall All You, see S. Barahmand and S. Ghandeharizadeh, S. Barahmand, "*Recall All You See,*" Grace Hopper Celebration of Women in Computing, Oregon, 2011, envisions a social networking system that empowers its users to store, retrieve, and share data produced by devices that stream continuous media, audio and video data. Example devices include the popular Apple iPhone and inexpensive cameras from Panasonic and Linksys. Similar to other social networking sites, a user registers a profile with RAYS and proceeds to invite others as friends. A user may register streaming devices and invite others to view and record from them. Moreover, the user's profile consists of a "Live Friends" section that displays those friends with a device that is actively streaming. The user may contact these friends to view their streams.

Two popular navigation paths of RAYS were used to evaluate the GT: Browse and Toggle streaming (Toggle for short). While Browse is a read-only workload, Toggle results in updates to the database requiring the key-value pairs to remain consistent with the tabular data. They are each described in turn.

Browse emulates four clicks to model a user viewing her profile, her invitations to view streams, and her list of friends followed with the profile of a friend. It issues 38 SQL queries to the RDBMS. With a CASQL, Browsing issues 8 KVS get operations. For each get that observes a miss, it performs a put operation. With an empty KVS, the get operations observe no hits and this sequence performs 8 put operations.

Toggle corresponds to a sequence of three clicks where a user views her profile, her list of registered devices and toggles the state of a device. The first two result in a total of 23 SQL queries. With a CASQL, Toggle issues 7 get operations and, with an empty KVS, observes a miss for all 7. This causes Toggle to perform 7 put operations to populate the KVS. With the last user click, if the device is streaming then the user stops this stream. Otherwise, the user initiates a stream from the device. This results in 3 update commands to the database. With Trig, these updates invoke triggers that delete KVS entries corresponding to both the profile (Approximated by the amount of stale data produced without the GT and devices pages. With a populated KVS, the number of deletes is higher because each toggle invalidates the "Live Friends" section of those friends with a KVS entry.

The multi-threaded workload generator targets a database with a fixed number of users, $\omega$. A thread simulates sequential arrival of n users performing one sequence at a time. There is a fixed delay, interarrival time $\theta$, between two users issued by the thread. A thread selects the identity of a user by employing a random number generator conditioned using a Zipfian distribution with a mean of 0.27. N threads model N simultaneous users accessing the system. In the single user (1 thread, N=1) experiments, this means 20% of users have 80% likelihood of being selected. Once a user arrives and her identity is selected, she picks a Toggle sequence with probability of u and a Browsing sequence with probability (1−u). There is a fixed think time $\epsilon$ between the user clicks that constitute a sequence.

TABLE 1

Workload parameters and their definitions

| | Database parameters |
|---|---|
| $\omega$ | Number of users in the database. |
| $\phi$ | Number of friends per user. |
| | Workload parameters |
| N | Number of simultaneous users/threads. |
| n | Number of users emulated by a thread. |
| $\epsilon$ | Think time between user clicks executing a sequence. |
| $\theta$ | Inter-arrival time between users emulated by a thread. |
| $\mu$ | Probability of a user invoking the Toggle sequence. |

The workload generator maintains both the structure of the synthetic database and the activities of different users to detect key-value pairs (HTML pages) that are not consistent with the state of the tabular data, termed stale data. The workload generator produces unique users accessing RAYS simultaneously. This means a more uniform distribution of access to data with a larger number of threads. While this is no longer a true Zipfian distribution, obtained results from a system with and without the GT are comparable because the same workload is used with each alternative.

To measure the amount of stale data with 100% accuracy, the workload generator must maintain the status of different devices managed by RAYS and serialize simultaneous user requests and issue one to CASQL at a time. This is unrealistic and would eliminate all race conditions. Instead, the workload allows the generator to issue requests simultaneously and used time stamps to detect its internal race conditions. This results in false positives where an identified stale data is due to an in-progress change to a time stamp. These false positives are observed when the workload generator is using RDBMS only.

Performance Results

Many experiments were conducted to quantify a) the amount of stale data eliminated by the GT, b) the impact of the GT on system performance, and c) how quickly the GT adapts $\Delta$ to changing workload characteristics. In all experiments, the GT reduced the amount of stale data 100 folds or more. Below is presented one experiment with a 300 fold reduction in stale data and discusses the other two metrics in turn.

This experiment focuses on an invalidation based technique implemented in the application. It targets a small database that fits in memory to quantify the overhead of the GT. With larger data sets that result in cache misses, the application must issue queries to the RDBMS. This results in higher response times that hide the overhead of the GT. If race conditions occur frequently then the GT will slow down a CASQL by reducing its cache hit rate. In the experiments, race conditions occur less than 3% of the time (Approximated by the amount of stale data produced without the GT). Thus, the GT's impact on system performance is negligible.

FIG. 4 shows the number of requests that observe stale data when a system is configured to either use or not the GT in which $\omega=1000$, $\phi=10$, $N=100$, $n=10,000$, $\epsilon=\theta=0$, and $\mu=1\%$. The x-axis of this figure is the execution time of the work-load. The y-axis is log scale and shows the number of requests that observe stale data. With the GT, only 343 requests (less than 0.009% of the total number of requests) observe stale data. These are attributed to the false positives produced by the workload generator, see below. Without the GT, more than 100,000 requests (2.4% of the total requests) observe stale data. The cache hit rate is approximately 85% with and without the GT. Even though the database is small enough to fit in memory, the cache hit rate cannot approximate 100% because 10% of requests execute Toggle ($\mu=10\%$) which invalidate cache entries.

The GT may adapt to changing workloads by adjusting the value of $\Delta$. The system load is varied by varying the number of simultaneous users accessing the system, N. The different patterns ranging from those that change the load abruptly (switch from 1 to 100 simultaneous users) to those that change the load gracefully. In each case, the GT adjusts the value of $\Delta$ quickly, minimizing the number of KVS inserts rejected due to a small value of $\Delta$. Such rejections are typically a negligible percentage of the total number of requests processed. Below, one experiment is reported.

This experiment varied the number of simultaneous users (N) from 1 to 10, 20, 50, 100 and back to 50, 20, 10 and 1. For each setting, a user issues 1000 requests. FIG. 5 illustrates an example of a varying system load. FIG. 5 shows the value of $\Delta$ when compared with the maximum observed RT, see discussions above. As the load increases, the GT increases the value of $\Delta$ to prevent rejection of KVS inserts unnecessarily. Similarly, when the load is decreased, the GT reduces the value of $\Delta$ to free memory by preventing gumballs from occupying the cache longer than necessary. $\Delta$ is higher than the observed maximum response time because its inflation value is set to 2. This experiment issues more than two hundred thousand put requests and the GT rejects fewer than 600 due to small $\Delta$ values.

One variant of the GT may operate as follows. It assigns a time stamp to the first client that requests a data item and observes a miss. All other clients requesting the same data item are provided a special time stamp to cause them to wait for some time and try again. The first client with a valid miss time stamp may compute the data item, and insert the data item in the cache by providing both the data item and its valid miss time stamp. A delete for a key-value pair causes the server to invalidate the time stamp that it handed out to a client. This variant does not generate gumballs.

Another variant of Gumball may be to allow gumballs to live in the cache server indefinitely. When a delete is issued for a data item, the cache server generates a gumball with the current time if one does not exist. Otherwise, it proceeds to update the time stamp of the existing gumball to the current time. This modifies the pseudo-code of "Put" in FIG. 3 by removing Steps 2 and 5.

CONCLUSION

The GT may be used as a race condition detection and prevention technique for mid and other tier in-memory caches that complement a RDBMS to enhance performance. This technique may work with all RDBMSs and alternative invalidation-based approaches to cache consistency. The social networking benchmark suffers from a few false positives (thousandth of one percent of issued request). These should be eliminated without slowing down the workload generator.

Unless otherwise indicated, the various clients and severs that have been discussed herein are implemented with a computer system configured to perform the functions that have been described herein for the component. Each computer system includes one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A data cache server for processing requests from a data cache client to put, get, and delete data items into or from the data cache server, each data item being based on data in a data store, the data cache server comprising:
   a data cache memory that has a configuration that stores data items; and
   a processing system, including a processor, that has a configuration that:
      in response to each request to put a data item into the data cache server:
         determines whether any of the data in the data store on which the data item is based has changed;
         puts the data item into the data cache memory if none of the data in the data store on which the data item is based has been determined to have changed; and
         does not put the data item into the data cache memory if data in the data store on which the data item is based has been determined to have changed;
      in response to each request to get a data item from the data cache server, reads the requested data item from the data cache memory and delivers it to the data cache client that requested the data item, if the requested data item is present in the data cache memory; and
      in response to each request to delete a data item from the data cache server, deletes the requested data item from the data cache memory, if it is present in the data cache memory,
      wherein the processing system has a configuration that, in response to each request to get a data item from the data cache server, determines whether the requested data items is in the data cache memory and, if not, reports the miss to the data cache client that sent the request to get the data item, along with the miss time at which the miss occurred.

2. The data cache server of claim 1 wherein the processing system has a configuration that, in response to each request to delete a data item, stores a delete time at which the request to delete the data item is processed.

3. The data cache server of claim 2 wherein the processing system has a configuration that, in response to each request to delete a data item, checks whether an earlier delete time for that data item is in cache memory and, if so, changes the stored delete time for that data item to the current time.

4. The data cache server of claim 2 wherein the processing system has a configuration that deletes each delete time from cache memory when the difference between the current time and the stored delete time exceeds a pre-determined threshold.

5. The data cache server of claim 4 wherein the processing system has a configuration that dynamically adjusts the pre-determined threshold based on real time measurements of the time it takes a data item to be created from data in the data store and delivered to the data cache server.

6. The data cache server of claim 2 wherein:
one request to put a data item into the data cache server includes a miss time indicative of a time at which a previously request to get the data item from the data cache server was unsuccessful; and
the processing system has a configuration that, in response to the one request to put, does not put the data item into the data cache memory if the miss time is before a stored delete time for the data item.

7. The data cache server of claim 2 wherein the processing system has a configuration that deletes delete times from cache memory when needed to free up storage.

8. The data cache server of claim 1 wherein:
one request to put a data item into the data cache server includes a miss time indicative of a time at which a previously request to get the data item from the data cache server was unsuccessful; and
each data item in the data cache memory is stored along with a key value and a storage time at which the data item was stored in the data cache memory; and
the processing system has a configuration that, in response to the one request to put, does not put the data item into memory if:
there is another data item in the data cache memory with the same key value as the data item that is requested to be put; and
the miss time of the data item that is requested to be put is before the storage time of the other data item with the same key value.

9. The data cache server of claim 1 wherein:
one request to put a data item into the data cache server includes a miss time indicative of a time at which a previously request to get the data item from the data cache server was unsuccessful; and
the processing system has a configuration that, in response to the request to put, stores the miss time with the data item in the data cache memory.

10. The data cache server of claim 1 wherein the processing system has a configuration that deletes data items in the data cache memory to free up space in the data cache memory and, when it does, saves the time at which each data item is deleted.

11. A non-transitory, tangible, computer-readable storage medium containing a program of instructions that causes a data cache server running the program of instructions to process requests from a data cache client to put, get, and delete data items into or from the data cache server, each data item being based on data in a data store, including:
in response to each request to put a data item into the data cache server:
determine whether any of the data in the data store on which the data item is based has changed;
put the data item into a data cache memory if none of the data in the data store on which the data item is based has been determined to have changed; and
not put the data item into the data cache memory if data in the data store on which the data item is based has been determined to have changed;
in response to each request to get a data item from the data cache server, read the requested data item from the data cache memory and deliver it to the data cache client that requested the data item, if the requested data item is present in the data cache memory; and
in response to each request to delete a data item from the data cache server, delete the requested data item from the data cache memory, if it is present in the data cache memory,
wherein the program of instructions causes the data cache server running the program of instructions to, in response to each request to get a data item from the data cache server, determine whether the requested data items is in the data cache memory and, if not, report the miss to the data cache client that sent the request to get the data item, along with the miss time at which the miss occurred.

12. The computer-readable storage medium of claim 11 wherein the program of instructions causes the data cache server running the program of instructions to, in response to each request to delete a data item, store a delete time at which the request to delete the data item is processed.

13. The computer-readable storage medium of claim 12 wherein the program of instructions causes the data cache server running the program of instructions to, in response to each request to delete a data item, check whether an earlier delete time for that data item is in cache memory and, if so, change the stored delete time for that data item to the current time.

14. The computer-readable storage medium of claim 12 wherein the program of instructions causes the data cache server running the program of instructions to delete each delete time from cache memory when the difference between the current time and the stored delete time exceeds a predetermined threshold.

15. The computer-readable storage medium of claim 14 wherein the program of instructions causes the data cache server running the program of instructions to dynamically adjust the pre-determined threshold based on real time measurements of the time it takes a data item to be created from data in the data store and delivered to the data cache server.

16. The computer-readable storage medium of claim 12 wherein:
one request to put a data item into the data cache server includes a miss time indicative of a time at which a previously request to get the data item from the data cache server was unsuccessful; and
the program of instructions causes the data cache server running the program of instructions to, in response to the one request to put, not put the data item into the data cache memory if the miss time is before a stored delete time for the data item.

17. The computer-readable storage medium of claim 12 wherein the program of instructions causes the data cache server running the program of instructions to purge delete times from storage when needed to free up cache memory.

18. The computer-readable storage medium of claim 11 wherein:
one request to put a data item into the data cache server includes a miss time indicative of a time at which a previously request to get the data item from the data cache server was unsuccessful; and
each data item in the data cache memory is stored along with a key value and a storage time at which the data item was stored in the data cache memory; and the program of instructions causes the data cache server running the program of instructions to, in response to the one request to put, not put the data item into memory if:
there is another data item in the data cache memory with the same key value as the data item that is requested to be put; and
the miss time of the data item that is requested to be put is before the storage time of the other data item with the same key value.

19. The computer-readable storage medium of claim 11 wherein:
one request to put a data item into the data cache server includes a miss time indicative of a time at which a previously request to get the data item from the data cache server was unsuccessful; and
the program of instructions causes the data cache server running the program of instructions to, in response to the request to put, stores the miss time with the data item in the data cache memory.

20. The computer-readable storage medium of claim 11 wherein the program of instructions causes the data cache server running the program of instructions to delete data items in the data cache memory to free up space in the data cache memory and, when it does, save the time at which each data item is deleted.

21. A data cache client comprising a processing system, including a processor, having a configuration that:
sends requests to a data cache server to put, get, and delete data items into or from the data cache server;
in response to each request to get a data item from the data cache server that does not exist in the data cache server:
receives a response from the data cache server that indicates that the data item does not exist on the data cache server, along with a miss time at which the miss occurred; and
stores the miss time; and
along with each request to put a data item in the data cache server that was previously indicated as being missing from the data cache server in response to a request to get the data item, sends the miss time along with the request to put.

22. A non-transitory, tangible, computer-readable storage medium containing a program of instructions configured to cause a data cache client running the program of instructions to:
send requests to a data cache server to put, get, and delete data items into or from the data cache server;
in response to each request to get a data item from the data cache server that does not exist in the data cache server:
receive a response from the data cache server that indicates that the data item does not exist on the data cache server, along with a miss time at which the miss occurred; and
store the miss time; and
along with each request to put a data item in the data cache server that was previously indicated as being missing from the data cache server in response to a request to get the data item, send the miss time along with the request to put.

23. A data cache server for processing requests from a data cache client to put, get, and delete data items into or from the data cache server, each data item being based on data in a data store, the data cache server comprising:
a data cache memory that has a configuration that stores data items; and
a processing system, including a processor, that has a configuration that:
in response to each request to put a data item into the data cache server:
determines whether any of the data in the data store on which the data item is based has changed;
puts the data item into the data cache memory if none of the data in the data store on which the data item is based has been determined to have changed; and
does not put the data item into the data cache memory if data in the data store on which the data item is based has been determined to have changed;
in response to each request to get a data item from the data cache server, reads the requested data item from the data cache memory and delivers it to the data cache client that requested the data item, if the requested data item is present in the data cache memory; and
in response to each request to delete a data item from the data cache server, deletes the requested data item from the data cache memory, if it is present in the data cache memory,
wherein the processing system has a configuration that, in response to each request to delete a data item, stores a delete time at which the request to delete the data item is processed, and
wherein:
one request to put a data item into the data cache server includes a miss time indicative of a time at which a previously request to get the data item from the data cache server was unsuccessful; and
the processing system has a configuration that, in response to the one request to put, does not put the data item into the data cache memory if the miss time is before a stored delete time for the data item.

24. A data cache server for processing requests from a data cache client to put, get, and delete data items into or from the data cache server, each data item being based on data in a data store, the data cache server comprising:
a data cache memory that has a configuration that stores data items; and
a processing system, including a processor, that has a configuration that:
in response to each request to put a data item into the data cache server:
determines whether any of the data in the data store on which the data item is based has changed;
puts the data item into the data cache memory if none of the data in the data store on which the data item is based has been determined to have changed; and
does not put the data item into the data cache memory if data in the data store on which the data item is based has been determined to have changed;
in response to each request to get a data item from the data cache server, reads the requested data item from the data cache memory and delivers it to the data cache client that requested the data item, if the requested data item is present in the data cache memory; and
in response to each request to delete a data item from the data cache server, deletes the requested data item from the data cache memory, if it is present in the data cache memory, wherein:
    one request to put a data item into the data cache server includes a miss time indicative of a time at which a previously request to get the data item from the data cache server was unsuccessful;
    each data item in the data cache memory is stored along with a key value and a storage time at which the data item was stored in the data cache memory; and
    the processing system has a configuration that, in response to the one request to put, does not put the data item into memory if:
        there is another data item in the data cache memory with the same key value as the data item that is requested to be put; and
        the miss time of the data item that is requested to be put is before the storage time of the other data item with the same key value.

25. A data cache server for processing requests from a data cache client to put, get, and delete data items into or from the data cache server, each data item being based on data in a data store, the data cache server comprising:
    a data cache memory that has a configuration that stores data items; and
    a processing system, including a processor, that has a configuration that:
        in response to each request to put a data item into the data cache server:
            determines whether any of the data in the data store on which the data item is based has changed;
            puts the data item into the data cache memory if none of the data in the data store on which the data item is based has been determined to have changed; and
            does not put the data item into the data cache memory if data in the data store on which the data item is based has been determined to have changed;
        in response to each request to get a data item from the data cache server, reads the requested data item from the data cache memory and delivers it to the data cache client that requested the data item, if the requested data item is present in the data cache memory; and
        in response to each request to delete a data item from the data cache server, deletes the requested data item from the data cache memory, if it is present in the data cache memory,
wherein:
    one request to put a data item into the data cache server includes a miss time indicative of a time at which a previously request to get the data item from the data cache server was unsuccessful; and
    the processing system has a configuration that, in response to the request to put, stores the miss time with the data item in the data cache memory.

* * * * *